United States Patent [19]

Connolly et al.

[11] Patent Number: 4,725,176
[45] Date of Patent: Feb. 16, 1988

[54] FLUID ACTUATED NUT

[75] Inventors: James D. Connolly; Darrel Huff, both of Princeton, W. Va.

[73] Assignee: Conn-Weld Industries, Inc., Princeton, W. Va.

[21] Appl. No.: 748,479

[22] Filed: Jun. 25, 1985

[51] Int. Cl.⁴ ............................................. F16B 37/00
[52] U.S. Cl. .................................. 411/427; 411/432; 411/434; 411/548
[58] Field of Search ................ 411/434, 433, 910, 231, 411/232, 291, 924, 427, 391, 548, 533, 235, 108, 222, 8, 9, 10, 11, 12, 916, 917, 20, 391; 292/4

[56] References Cited

U.S. PATENT DOCUMENTS

| | | | |
|---|---|---|---|
| 1,026,472 | 5/1912 | Smith | 411/222 X |
| 1,120,530 | 12/1914 | Pieper | 411/433 X |
| 2,571,265 | 10/1951 | Leufren | 411/434 |
| 2,931,087 | 4/1960 | Farrar et al. | 411/133 X |
| 3,117,485 | 1/1964 | Jansen | 411/434 X |
| 3,233,499 | 2/1966 | Gale | 411/434 |
| 3,237,505 | 3/1966 | Peterson | 411/548 X |
| 3,316,953 | 5/1967 | Frahsson et al. | 411/108 |
| 3,334,536 | 8/1967 | Armstrong | 411/434 |
| 3,463,044 | 8/1969 | Rossman et al. | 411/427 X |
| 3,910,154 | 10/1975 | Gardner | 411/434 |
| 3,926,090 | 12/1975 | Bunker | 411/434 |
| 4,064,783 | 12/1977 | Ess | 411/434 |

FOREIGN PATENT DOCUMENTS

| | | | |
|---|---|---|---|
| 834143 | 8/1938 | France | 411/433 |
| 1332745 | 6/1963 | France | 411/433 |
| 3041 | of 1869 | United Kingdom | 411/231 |
| 558302 | 12/1943 | United Kingdom | 411/433 |
| 908360 | 10/1962 | United Kingdom | 411/378 |
| 699246 | 11/1979 | U.S.S.R. | 411/8 |

Primary Examiner—Gary L. Smith
Assistant Examiner—Rodney M. Lindsey
Attorney, Agent, or Firm—Wilmer Mechlin

[57] ABSTRACT

A fluid actuated nut having a cylindrical casing engageable at an inner end with a base, the casing containing a coaxial relatively axially shiftable plunger having an inwardly opening partial central bore for threadedly receiving a shank of a bolt, a compression spring acting outwardly on the plunger and inwardly against the casing, and a fluid pressure chamber in the casing outwardly of the piston, the nut being applied by screwing the piston onto the bolt shank to the point of engagement of the inner end of the casing with the base and tightened by sequentially compressing the spring by fluid injected under pressure in the fluid chamber for shifting the casing away from the base, turning the casing to reengage the base and releasing the fluid pressure to expand the spring, and repeating the sequence as necessary to produce the desired tensile and/or compressive force, the nut being loosened by applying fluid pressure to advance the plunger for compressing the spring and disengaging the casing from the base.

9 Claims, 4 Drawing Figures

FLUID ACTUATED NUT

BACKGROUND OF THE INVENTION

Fluid actuated or operated nuts heretofore proposed are typified by U.S. Pat. Nos. 2,571,265, to Leufven 2,626,543, Danly, 3,154,006, Novak and 3,464,044, Rossman et al. In all of these patents, a tensile or compressive force is applied by fluid pressure, with the difference that in Leufven and Novak the force, once applied, is transferred to a nut or shim before the fluid pressure is released, while in Danly and Rossman the force is both applied and maintained by fluid pressure and released by discharging the fluid responsible for the pressure. As opposed, in Leufven and Novak relief of the tension on the bolt is achieved by applying fluid pressure to increase that tension and thereby free or loosen for removal the nut in Leufven and shim in Novak.

The concern of the present invention is an improved fluid actuated nut which depends on a spring force for maintaining a bolt under tension and utilizes fluid pressure for compressing and inactivating the spring to facilitate both tightening and removal.

SUMMARY OF THE INVENTION

The primary objective of the present invention is to provide an improved fluid actuated nut depending on compression spring means acting between relatively axially moveable members for exerting a tensile and/or compressive force and on fluid pressure acting between said members in opposition to the spring means for inactivating the spring means during application and removal of the nut.

Another object of the invention is to provide a fluid actuated nut depending for exerting a compressive force on a base on compression spring means acting between relatively axially movable members and both tightenable and releasable by applying fluid pressure between said members to compress the spring means and thereby disengage the nut from the base.

A further object of the invention is to provide a fluid actuated nut having a casing engageable with a base, a relatively axially shiftable plunger in said casing and having an axial bore for threadedly receiving an end of a bolt, compression spring means in and acting inwardly on the casing and outwardly on the bolt for applying and maintaining a compressive force on the base and a tensile force on the bolt, and means for applying fluid pressure to the plunger in opposition to the spring means for inactivating the spring means during application and removal of the nut.

Another object of the invention is to provide a fluid actuated nut including compression spring means for applying and maintaining a compressive and/or tensile force, the nut being chargeable with fluid pressure confined in action to the nut for inactivating the spring means.

An additional object of the invention is to provide a fluid actuated nut having a cylindrical casing engageable at an inner end with a base and closed at the outer end by a cap, a centrally apertured thrust ring in the inner end portion of the casing and held against inward movement relative thereto, a coaxial cylindrical plunger mounted for relative axial and against relative rotative movement in the casing inwardly of and having a head confronting the cap and a relatively reduced stem instanding from the head and slidably received in the aperture in the thrust ring, compression spring means encircling the plunger stem and acting between the plunger head and thrust ring for normally urging the plunger outwardly relative to the casing, and a pressure chamber in the casing between the cap and the plunger head and chargeable through the cap with fluid under pressure for applying to the plunger a force opposing the spring force for driving the plunger inwardly relative to the casing and thereby compressing and inactivating the spring means.

Another object of the invention is to provide a fluid actuated nut having a casing engageable at an inner end with a base, a coaxial plunger mounted in the casing for axial and against rotative movement relative thereto, a partial downwardly opening axial threaded bore in the plunger for receiving a shank of a bolt, compression spring means acting between the plunger and casing for urging the plunger outwardly relative to said casing and thereby applying a tensile force to the bolt, and a pressure chamber in the casing outwardly of the plunger and chargeable with fluid under pressure for applying to the plunger a force opposing the spring force for compressing and thereby inactivating the spring means.

Yet another object of the invention is to provide a fluid actuated nut which is self-contained, has in a casing a plunger drivable outwardly and inwardly relative to the casing respectively by compression spring means and fluid pressure, the spring means for applying and maintaining a tensile and/or compressive force and the fluid pressure for deactivating the spring means to facilitate tightening and loosening of the nut.

The foregoing and other objects and features of the invention will appear hereinafter in the detailed description, be particularly pointed out in the appended claims, and be illustrated in the accompanying drawings, in which:

FIGURE DESCRIPTION

DETAILED DESCRIPTION

Figure 1:
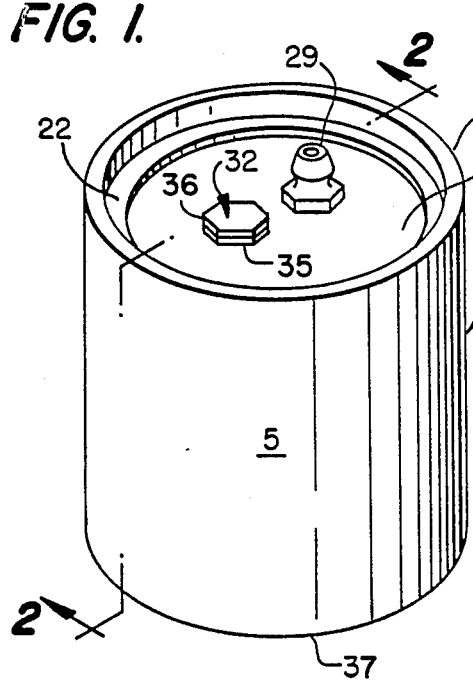
FIG. 1 is a perspective view of a preferred embodiment of the improved fluid actuated nut of the present invention.

Referring now in detail to the drawings in which like reference characters designate like parts, the improved fluid actuated nut of the present invention is adapted upon threading onto a shank of a bolt or other cooperating member, to apply and maintain by a compression spring a tensile and/or compressive force and to have that force relieved by applying fluid pressure for partially or fully compressing the spring.

Designated as 1, the fluid actuated nut, as exemplary of the invention, is illustrated as threadedly receiving or screwed onto a shank or shaft 2 of a cooperating connecting, fastening or holding member 3, such as a bolt having a block, ring, hook or other type of head 4 suitable for the intended installation. The nut 1 is comprised of a preferably cylindrical casing or housing 5 containing a concentric or coaxial, relatively axially shiftable or reciprocal plunger or piston 6. Having an internally threaded, inwardly or downwardly opening, outwardly closed or partial central bore 7 for receiving a threaded end portion of the shank 2, the plunger 6 is generally cylindrical with, as an upper or outer part, a head 8 slidably fitting the inside 9 of the side wall 10 of the casing 5 and, as a lower or inner part, an instanding relatively reduced or smaller diameter coaxial stem 11 radially inset from the casing. The plunger stem 11 is slidably received in and adapted to extend or project through a central aperture 12 of a thrust ring 13 radially outwardly engaging the casing's side wall 10 and removably held against inward or downward movement relative to the casing, conveniently by a snap or retainer ring 14.

Occupying, outwardly or upwardly of the thrust ring 13, an annular cavity or space 15 around or about the stem 11, is a compression spring 16, which, for its superior performance under heavy loads, suitably is a disc or Belleville spring. Acting between an annular abutment or shoulder 17 on the inner or underside of the plunger head 8 and the thrust ring 13 and reacting against the casing 5 through the thrust ring and the retainer ring 14, the compression spring 16 applies to the plunger an upward or outward force for urging the plunger upwardly or outwardly relative to the casing 5. A set screw 18 extending radially through the side wall 10 of the casing 5 and into an axially extending slot 19 in a side of the plunger head 8, holds the casing and plunger against relative rotation so that the casing and plunger will rotate or turn in unison in response to any rotative movement imparted to either member.

The casing 5 is closed at or adjacent its top or upper or outer end 20 by a top cap or closure member 21, which may be integral or rigid with the casing or, as illustrated, a suitably cylindrical plug slidably insertable into the casing through its otherwise open upper end and conveniently held therein against relative upward or outward axial movement by a retainer or snap ring 22. The top cap 21 and plunger 6 bound by their confronting faces or ends the axial limits of a pressure or actuating fluid chamber 23 and are axially spaced by an interposed spacer ring 24, which may be integral with or fixed to either of the members or, as illustrated, a separate washer, for limiting the upward movement of the plunger relative to the top cap and thus ensuring that the pressure chamber always will be partly open for receiving fluid under pressure. The plunger head 8 and, if separate from the casing 5, the cap 21 are peripherally grooved for seating or receiving gaskets, suitably in the form of O-rings 25, for sealingly engaging the side wall 10 of the casing against escape of fluid therebetween. Actuating fluid, indicated at 26, is injected or introduced into the pressure chamber 23 through an inlet or charge port 27 in the cap 21, into an outer end of which is screwed or otherwise inserted an inlet check valve 28 forming part of a fitting 29 suitable for the type of actuating fluid to be employed in the intended installation, that illustrated being a grease fitting for coupling with a grease gun, indicated at 30 by its nozzle, when grease rather than a gas or liquid is to be used as the actuating fluid.

As will hereafter be explained, in the operation of the fluid actuated nut of the present invention, the pressure chamber 23 must be both charged with and discharged of the actuating fluid 26 and the discharge may be through the inlet fitting 29 by using the grease gun or other applicator for opening the check valve 28 to permit the fluid to escape. However, even when the improved nut is applied to a bolt with a shank diameter as small as about ⅝ inches (1.59 cm), the force applied by the grease gun can be as high as 5,000 lbs. (2265 kg), requiring that the check valve 28 of the fitting 29 be nonleaking under such force. With the applied force of that order, use of the inlet fitting 29 for both charging and discharging the pressure chamber 24 can be bothersome to the operator. It therefore is optional to provide in the cap 21 an outlet or discharge port 31, separate and spaced radially from the inlet port 27, and adapting it to control the discharge of the grease or other pressurized fluid 26 in the pressure chamber 23. Suitably for that purpose, the outlet port 31 can be fine-threaded for receiving from above a correspondingly threaded, preferably noncorrosive, headed bolt 32 having in a side of its shank 33 an axially extending restricted slot or passage 34 through which the pressurized fluid 26 can be discharged at a controlled rate when the bolt is loosened. The bolt 32 normally is locked in port-closing position by a locknut 35 interposed between its head 36 and the cap 21 and the upper end of the slot 34 preferably is spaced below or terminates short of the locknut. With this construction and the shank 33 desirably extending below the locknut 35 substantially the thickness of the cap 21, the outlet port 31 is sealable against accidental escape of fluid from the pressure chamber 23 by both the seating of the locknut against the cap 21 and the interengaging threads above the slot 34.

The improved fluid actuated nut 1 is adapted to apply a tensile or compressive force or both, depending upon the use to which it is put. It is particularly valuable in installations, such as vibrators for separating coal or other solids from slurries, in which the vibrating screens are bolted in place and must frequently be removed for repair or replacement. At present the bolts each require two nuts, the second for locking the first in place and, since exposed to the liquid in the slurry, the nuts become corroded and locked or frozen to the bolts in the interval between installation and removal of a screen, in many cases requiring the nuts to be burned off by a torch with consequent destruction of both the nuts and the bolts.

Designed for a long service life, the improved nut may have the casing 5, cap 21, fitting 29, bolt 32 and locknut 35 made of stainless steel or other noncorrosive material. This with the casing sealed against entry of moisture through its upper end 20 and in service seated at its bottom or lower or inner end 37 against a mounting base or bracket, will protect the plunger 6 from corrosion. In use the improved nut requires a bolt or other cooperating member 3 having a threaded shank 2 screwable into the bore 7 in its plunger or axially shiftable inside member 6, a supplier or applicator of fluid under pressure, such as the grease gun 30, and that the mounting base 38 be apertured for passing the threaded shank of the cooperating member and of an area sufficient to be engaged and reacted against by the bottom or inner end 37 of its casing or outside member 5. As in the illustrated embodiment in which the nut is used with a bolt 3 in clamping together a pair of workpieces, the base 38 suitably will be the confronting face or surface of the adjoining workpiece. Alternately, as in a machine in which a workpiece or working component is mounted under tension, the base 38 can be a platform or mounting bracket on or fixed to the machine's frame.

Figure 2:
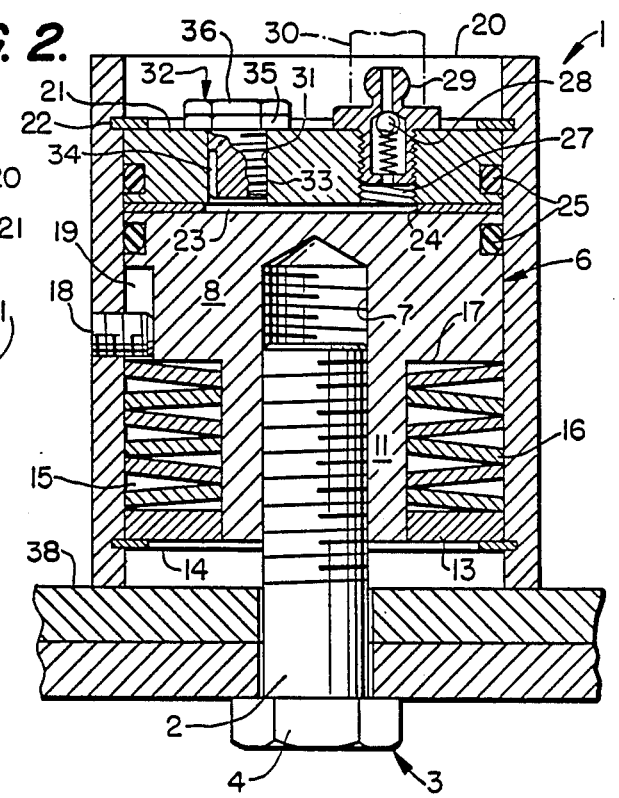
FIG. 2 is a central vertical sectional view of the nut of FIG. 1 showing the nut screwed onto a shank of a bolt and seated on a base.
Figure 3:
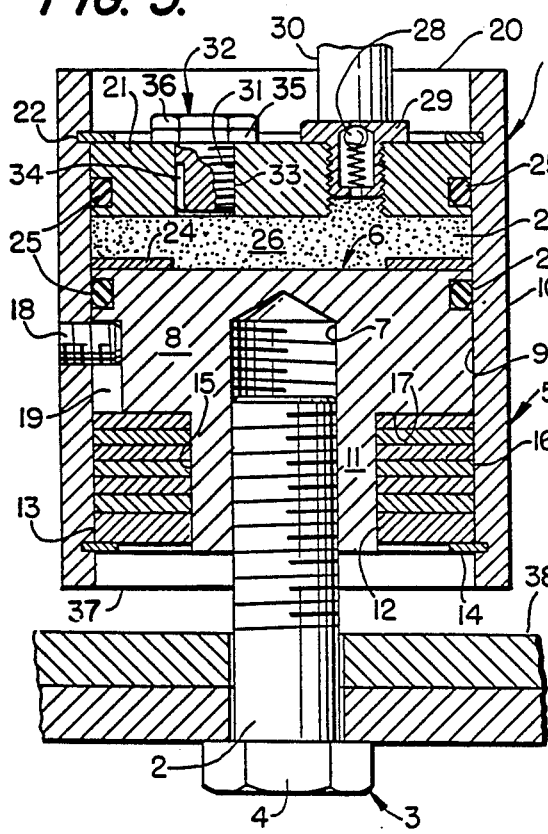
FIG. 3 is a view of the nut of FIG. 2 after charging with fluid under pressure.
Figure 4:
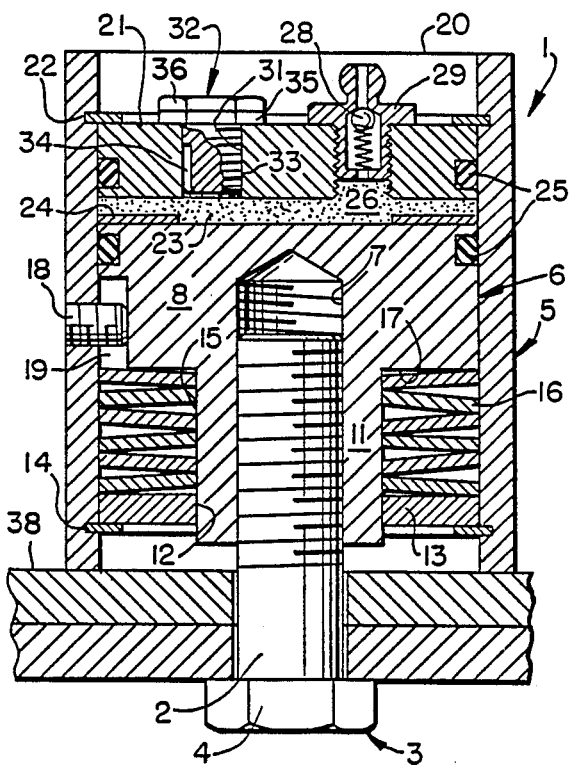
FIG. 4 is a view of the nut of FIG. 3 with the nut screwed down on the bolt shank and the fluid partially discharged for enabling the nut to apply a tensile force on the bolt and compressive force on the base.

In assembling the improved nut, the compression spring 16 preferably is preloaded or precompressed sufficiently to eliminate that part of its range of compression adjacent its free height in which its capacity to resist compression or potential energy is lowest. Usually, the improved nut will be shipped to a customer without charging the pressure chamber 23. In such case, the nut will be applied in the three-step sequence shown in FIGS. 2-4, with the sequence repeated if necessary. In the first step of FIG. 2, the nut 1 is screwed onto the shank 2 of the bolt 3, suitably by turning the casing 5 by hand until its bottom 37 has engaged the base 38. Fluid under pressure is then injected into the pressure chamber 23 to expand the chamber and drive the plunger 6 inwardly relative to the casing 5, the effect, as shown in FIG. 3, being to shift the casing outwardly relative to the plunger 6 and bolt shank 2 and disengage it from the base 38. In the last step of FIG. 4, the nut is again turned, suitably by hand on the bolt shank 2 to take up slack in the bolt and reengage the casing 5 with the base 38. At this point the inward force of the fluid pressure of the plunger 6 responsible for compressing the spring 16 is relieved by controlled discharge of fluid from the pressure chamber 23 through the discharge port 31. Then free to expand, the spring 16 in forcing the plunger 6 upwardly in the casing 5, will apply a tensile force to the shank of the bolt and with bolt's head 3, a compressive force to the interposed workpieces.

If by the steps of the above sequence the desired forces on the bolt 3 and base 38 have not been reached, as because the slack between the nut and bolt 3 has not been fully taken up or the spring 16 has been fully expanded to its initial preloaded condition, the sequence is repeated until the target force is reached. The forces exerted by the nut will depend on the preselected strength of the spring 16 and the force applied to compress it by the actuating fluid 26 in the pressure chamber 23, but for an exemplary use in mounting a vibrating screen, usually will range from about 1700 to about 2600 pounds (770-1178 kg).

If, as feasible, the fluid actuated nut is shipped with the pressure chamber 24 precharged with grease or other actuating fluid 26 and the compression spring 16 fully compressed, the application sequence is reduced to two steps, the first screwing the nut onto the shank 2 of the bolt 3 to take up slack in the bolt and engage the bottom 37 of the casing 5 with the base 38 and the second, controlled discharge of fluid from the pressure chamber through the discharge port 31 for availing of the potential energy of the spring 16 to apply tensile and compressive forces of the desired order respectively to the bolt 3 and the base 38.

Applying and maintaining its tensile and/or compressive force by the spring 16, the improved nut 1, for removal, requires only injection of fluid into the pressure chamber 23 at a pressure such that the spring 16 will be compressed between the plunger head 8 and the thrust ring 13 sufficiently to disengage or loosen the casing 5 from the base 38, at which point it can be removed for reuse by manually turning the casing 5 to unscrew the plunger 6 from the bolt shank 2. The action of the actuating fluid in both application and removal of the nut therefore is to loosen the nut by compressing and deactivating the spring 16. By contrast, in prior fluid actuated nuts, the force exerted by the nut is applied by fluid pressure and removal of the nut requires either discharge of the fluid if, as in Danly and Rossman, the fluid pressure is responsible for maintaining the force applied by the nut or, as in Leufven and Novak, to apply fluid pressure at an increased force to enable the shim in Danly and nut in Leufven to be removed.

From the above detailed description it will be apparent that there has been provided an improved fluid actuated nut which is self-contained and depends on a compression spring for applying with a cooperating member a tensile and/or compressive force and on an actuating fluid for compressing the spring and enabling the nut to be manually screwed both on and off a shank of the cooperating member. It should be understood that the described and disclosed embodiment is merely exemplary of the invention and that all modifications are intended to be included that do not depart from the spirit of the invention and the scope of the appended claims.

Having now described our invention, we claim:

1. A fluid actuated nut comprising a casing engageable with a base, a plunger in and axially movable relative to said casing and engageable with a shank of a bolt, compression spring means in said casing and acting therebetween said casing and plunger for exerting a tensile force on said bolt and/or a compressive force on said base, and means for inactivating said spring means by charging said nut with fluid pressure acting between said casing and plunger in opposition to said spring means during application and removal of said nut.

2. A fluid actuated nut comprising a casing engageable with a base, a plunger in and axially movable relative to said casing and engageable with a shank of a bolt, compression spring means in said casing and acting therebetween said casing and plunger for applying and maintaining a compressive force on said base and/or a tensile force on said bolt, and means for charging said nut with fluid pressure acting between said casing and plunger for inactivating said spring means.

3. A fluid actuated nut according to claim 1, wherein the compression spring means act between said casing and plunger for urging said plunger outwardly relative to said casing, said plunger having an inwardly opening axial bore for threadedly receiving through a bottom of said casing said shank of said bolt, and a pressure chamber in said casing outwardly of said plunger and chargeable with said fluid pressure for inactivating the spring means.

4. A fluid actuated nut comprising a cylindrical casing having a closed outer and an open inner end, a plunger mounted in said casing for relative axial and against relative rotative movement, said plunger having a downwardly opening central bore for threadedly receiving a shank of a cooperating connecting member, compression spring means in and reacting inwardly against said casing for applying a force urging said plunger outwardly relative thereto, and a pressure chamber in said casing between said closed upper end thereof and said plunger, said pressure chamber being chargeable with fluid under pressure for compressing and inactivating said spring means by an inward fluid force applied to said plunger.

5. A fluid actuated nut according to claim 4, wherein the plunger has a cylindrical head sealingly engaging a side wall of the casing and a coaxial cylindrical stem extending inwardly therefrom and inset radially from said sidewall, and including a thrust ring in and engaging said sidewall of the casing and releasably held against inward movement relative thereto, said thrust ring being centrally apertured for slidably receiving said shank, and the compression spring means encircles said shank and acts between said plunger head and thrust ring.

6. A fluid actuated nut according to claim 5, wherein the upper end of the casing is closed by a cap, and said cap is ported for charging and discharging therethrough of fluid under pressure to and from the pressure chamber.

7. A fluid actuated nut according to claim 6, wherein the porting of the cap includes separate radially spaced charge and discharge ports opening inwardly onto the pressure chamber, the charge port is fitted in its outer end with a fitting containing an inlet check valve, and the discharge port is fitted with means for controlling the rate of discharge of fluid from the pressure chamber.

8. A fluid actuated nut according to claim 7, wherein the discharge controlling means of the discharge port is a bolt having a threaded shank screwed into said port and having in a side of said shank a restricted passage for passing fluid from the pressure chamber when said bolt is loosened.

9. A fluid actuated nut according to claim 1, wherein the compression spring means is a disc spring.

* * * * *